(12) United States Patent
Törnqvist et al.

(10) Patent No.: US 6,388,378 B1
(45) Date of Patent: May 14, 2002

(54) INSULATIVE FILM FOR THIN FILM STRUCTURES

(75) Inventors: Runar Törnqvist, Kauniainen; Tuomas Pitkänen, Helsinki, both of (FI)

(73) Assignee: Planar Systems Inc., Espoo (FI)

( * ) Notice: Subject to any disclaimer, the term of this patent is extended or adjusted under 35 U.S.C. 154(b) by 0 days.

(21) Appl. No.: 09/354,095

(22) Filed: Jul. 15, 1999

(30) Foreign Application Priority Data

Jul. 28, 1998 (FI) .................................................. 981673

(51) Int. Cl.⁷ .................................................. H01J 1/70
(52) U.S. Cl. ........................ 313/509; 313/503; 313/506; 313/512
(58) Field of Search ...................... 257/59, 72; 313/509, 313/506, 504, 502, 503

(56) References Cited

U.S. PATENT DOCUMENTS

| | | | |
|---|---|---|---|
| 4,058,430 A | 11/1977 | Suntola et al. | |
| 4,389,973 A | 6/1983 | Suntola et al. | |
| 4,482,841 A | * 11/1984 | Tiku et al. | 313/503 |
| 4,486,487 A | 12/1984 | Skarp | |

FOREIGN PATENT DOCUMENTS

| EP | 0 349 193 | | 1/1990 |
|---|---|---|---|
| EP | 0349193 A2 | * | 3/1990 |

* cited by examiner

*Primary Examiner*—Vip Patel
*Assistant Examiner*—Ken A Berck
(74) *Attorney, Agent, or Firm*—McDermott, Will & Emery

(57) ABSTRACT

The present invention concerns an insulating film of a thin film structure deposited on an essentially alkali metal-free glass substrate, comprising alternating layers of aluminium oxide and titanium oxide and thin film electriluminescent device wherein said insulating film is incorporated as an insulating layer between the phosphor layer and the electrode layers. In the insulating film, the ratio between the cumulative thicknesses of said titanium oxide and said aluminium oxide is less than 0.75, and due to the ratio lower than that of prior art, good resistance against cracking of the film is obtained.

19 Claims, No Drawings

INSULATIVE FILM FOR THIN FILM STRUCTURES

BACKGROUND OF THE INVENTION

1. Field of the Invention

The present invention relates to thin film structures. In particular the invention concerns insulting films comprising aluminium oxide and titanium oxide for use as dielectric layers in electroluminescent thin film components.

2. Description of Related Art

Thin-film electroluminescent (TFEL) components are used as alternatives to cathode ray tubes, plasma displays, liquid crystal devices and light-emitting diodes (LEDs) for displaying information or data e.g. word or numerals. They are used especially in applications where a wide viewing angle, wide temperature range and a rugged structure are important.

EL display devices generally comprise a substrate, such as a glass plate, a first electrode layer provided on the substrate and a second electrode layer spaced apart from the first electrode layer, a phosphor layer fitted between the electrodes, and at least one dielectric layer provided on each side of the phosphor layer between the phosphor layer and the electrodes.

Aluminium oxide ($Al_2O_3$) has been used extensively in the thin film industry as an insulation material. Various more sophisticated dielectric materials have also been employed and suggested, including strontium titanium and barium tantalum binary oxides and silicon oxynitride (SiON). A particularly advantageous material is disclosed in U.S. patent specification Ser. No. 4,486,487 which describes an insulative film for a thin film structure, comprising alternating layers of aluminium oxide and titanium oxide. For this material, the abbreviation "ATO" will be used in the following. The prior art film consists of 10 to 200 layers of aluminium oxide and titanium oxide, each layer having a thickness of 3 to 1000 Å. According to a preferred embodiment, the ATO film is grown by the Atomic Layer Epitaxy (ALE) taking advantage of the ease of controlling the thickness of the film to be grown by that technique. The ATO dielectric of U.S. Pat. No. 4,486,487 has excellent properties, including a three times better breakdown strength than $Al_2O_3$.

Conventionally, sodium silicate glass (or shortened "soda lime" or "soda" glass) has been used as a substrate for thin film EL components made with ALE. There are, however, a number of disadvantages associated with this material. Thus, for many gas phase vapour deposition methods, in particular ALE, the processing temperatures employed of up to 500 to 600° C. are very close to or over the maximum temperature limits at which soda glass can be used. The dimensional stability of soda glass at elevated temperatures is not altogether satisfactory, and the shrinking of the material at high temperatures has to be taken into account during processing of the thin film structures. In some cases soda lime glass is not compatible with other processes. Finally, and importantly, it has been found that some migration of alkali metal, in particular sodium and potassium, ions from the glass substrate to the adjacent layers always takes place. This alkali metal ion migration gives rise to destruction of the thin film structure. In order to prevent the migration thin film stacks are provided with an ion diffusion barrier layer made from metal oxide or nitride.

Many of the problems related to soda glass as a substrate of ALE grown thin films can be avoided by using essentially alkali metal-free glass materials, such as borosilicate glasses. Such materials contain less than 1% alkali metals and the migration of alkali metal ions is negliable for most applications. However, our tests have shown that when a conventional ATO layer having an Al-to-Ti ratio of close to 1 (based on the cumulative thicknesses of the $Al_2O_3$ and the $TiO_2$ layers) is used as insulation in thin film structures supported on alkali metal-free glass substrates, cracking is observed immediately after thin film processing or after subsequent processing. This finding is surprising because for soda glass substrates the layer thicknesses have not been found to be of any particular relevance. Thus, U.S. Pat. No. 4,486,487 suggests that the layer thicknesses should not have any effect on mechanical strength properties.

Cracking is generally caused by internal or external stresses in the film. If the mechanical strength of the film is lower that the force introduced by these stresses, cracking and other types of mechanical failure occur. In many cases thin films made with vacuum deposition techniques exhibit internal stress, either tensile or compressive stress. These are usually characteristic for the deposition method used and even some techniques can give rise to tensile or compressive stress in the films depending on the process parameters used. Also the type of substrate has an effect on film stress.

SUMMARY OF THE INVENTION

It is an object of the present invention to eliminate the problems of the prior art and to provide an insulating film for a thin film structure comprising alternating layers of aluminium oxide and titanium oxide.

It is another object of the present invention to provide a thin film electroluminescent display device, comprising a substrate consisting of an essentially alkali metal-free glass.

These and other objects, together with the advantages thereof over known combination insulator films, which shall become apparent from the specification which follows, are accomplished by the invention as hereinafter described and claimed According to the present invention, the insulating film of a thin film structure deposited on an essentially alkali metal-free glass substrate is formed by alternating layers of aluminium oxide and titanium oxide while restricting the ratio between the cumulative thicknesses of said titanium oxide and said aluminium oxide layers to less than 0.75.

This film can be incorporated into thin film electroluminescent display devices as an insulating layer between the phosphor layer and the electrode layers.

More specifically, the present insulating films are mainly characterized by what is stated in the characterizing part of claim 1.

The thin film electroluminescent display devices according to the present invention are characterized by what is stated in the characterizing part of claim 7.

Considerable advantages are obtained by the present invention. Thus, good resistance is obtained against cracking of ATO film. In spite of the lowered titanium oxide concentrations the film still provides good breakthrough strength. The novel insulating layer structure can be used for a wide range of essentially alkali metal-free glass substrates, including borosilicate and aluminosilicate glasses. It is also compatible with many other processes.

Next, the invention will be examined more closely with the aid of the following detailed description and with reference to two working examples.

DETAILED DESCRIPTION OF THE INVENTION

The present invention is based on the provision of an insulating $Al_2O_3/TiO_2$ structure comprising alternating thin aluminium oxide and titanium oxide sheets grown layer by layer. According to a particularly preferred embodiment, the insulating film is grown from the corresponding volatile precursors by the Atomic Layer Epitaxy method, that is, using a pulsed infeed of the anion and cation initial reactants in an alternating sequence so as to prevent the surface of the substrate located in the reaction chamber from becoming simultaneously exposed to both initial reactants. The thin film growth process comprises a step in which an aluminium oxide layer is grown followed by a step of growing titanium oxide, both steps being repeated in an alternating sequence until the desired film thickness is obtained.

Any suitable volatile precursors of aluminium oxide and titanium oxide can be used including inorganic and organic aluminium and titanium compounds. Particularly useful compounds are represented by aluminium and titanium halogenoids, such as aluminium and titanium chlorides.

The aluminium chloride and titanium chloride layers are converted to the corresponding aluminium and titanium oxides, respectively, by using water vapour.

Details of the ALE method are described in U.S. Pat. Nos. 4,058,430 and 4,389,973, which are herewith incorporated by reference.

During the growth process the temperature is controlled and set high enough to prevent the precursor from condensing on the substrate surface, but simultaneously sufficiently low to essentially avoid thermal decomposition. The substrate temperature is typically about 400 to 500° C. The surface reactions take place at a low pressure in the region of 0.1 to 10 torr.

As mentioned above, according to the present invention, the insulating film comprising alternating layers of aluminium oxide and titanium oxide, has a ratio between the cumulative thicknesses of said titanium oxide and said aluminium oxide layers of less than 0.75. In the following this ratio will also be referred to as the "Ti-to-Al ratio".

Particularly preferred Ti-to-Al ratios are 0.2 to 0.7 or 0.25 to 0.6.

The intended ratios can be obtained by reducing the number of titanium oxide growth cycles with respect to the aluminium oxide growth cycles. As explained in Example 1 below, since the growth rate of aluminium and titanium oxides from aluminium and titanium chlorides are almost equal, the pulsing ratio (cycle ratio) will also give the thickness ratio of the layer.

In addition to or as an alternative to the reduction of the number of titanium growth cycles in the composite layer containing alternating layers of aluminium oxide and titanium oxide, it is also possible to influence the Ti-to-Al ratio by growing a buffer layer containing less titanium on either side or on both sides of the composite layer. Typically such a layer comprises aluminium oxide and it can be grown from aluminium chloride and water vapor in a similar fashion as the aluminium oxide layers of the composite layer. The thicknesses of the buffer layers amount to 1 to 50%, preferably 10 to 40%, of the cumulative thickness of the aluminium oxide layers of the second composite layer. The cumulative thickness of the aluminium oxide layers is 50 to 400 nm and the cumulative thickness of the titanium oxide layers is 35 to 300 nm.

By means of the invention it is possible to provide a novel Thin Film Electroluminescent display device, comprising a substrate consisting of an essentially alkali metal-free substrate;

a first electrode layer provided on the substrate;

a second electrode layer spaced apart from the first electrode layer;

at least one phosphor layer fitted between the electrodes; and at least one dielectric layer provided on each side of each phosphor layer between the phosphor layer and the electrodes.

As apparent from the above description, at least one of said dielectric layers is constituted by alternating layers of aluminium oxide and titanium oxide, the ratio between the cumulative thicknesses of said titanium oxide and said aluminium oxide layers being less than 0.75, preferably 0.2 to 0.6.

The insulating layers can have different thicknesses on each side of the phosphor. In particular, it is possible to produce a structure in which the lower dielectric layer has the minimum thickness required for achieving an integral layer having the necessary mechanical strength, whereas the breakthrough strength is mainly provided by the upper layer.

Furthermore, the Ti-to-Al ratio can differ in the layers on opposite sides of the phosphor layer. Thus, according to a particularly preferred embodiment, the dielectric layer on the opposite side of a phosphor layer with respect to the glass substrate has a smaller Ti-to-Al ratio than the dielectric layer on the same side of the phosphor layer as the glass substrate. To mention an example, the Ti-to-Al ratio of the top ATO layer can be less than 0.7 or 0.65 and that of the bottom ATO 0.7 to 0.85, provided that the Ti-to-Al ratio of the two layers together is less than 0.75.

The substrate used in the present invention can comprise any suitable glass substrate which is essentially free from alkali metals. For the purpose of the present invention this means that the glass contains less than 1% of alkali metal oxides (typically $Na_2O$ or $K_2O$). The shrinking of the material as a function of temperature is also small, in particular the ratio of the contraction coefficient to the coefficient of thermal expansion is close to 1, for example about 1 to 1.5.

Typical examples of suitable glass substrate comprise materials intended for use as electronic substrates. They are, e.g., characterized as borosilicate or aluminosilicate glasses.

The insulative layer can be combined with various luminescent layers, such as suitably doped or undoped ZnS and/or SrS phosphors.

The following non-limiting examples illustrate the invention:

EXAMPLE 1

A normal insulator/ZnS/insulator film stack was grown on a soda lime and a type of alkali free glass intended for electronics glass substrate use, namely Corning type 7059. Films were grown at 500 ° C. using the ALE (Atomic Layer Epitaxy) method. The temperature used is typical for Mn-doped ZnS films, and thus is a favourable selection for processing purposes. This temperature, however, is close to upper use temperature of soda lime glass. The upper use temperature of Corning type 7059 is several tens of degrees higher. Lower temperatures will cause problems in Mn doping of ZnS when $MnCl_2$ is used as precursor, since at temperatures below 500 ° C. vapour pressure of $MnCl_2$ becomes unpractically low.

Four different structures were made, using different cumulative thickness of $TiO_2$ and $Al_2O_3$. In all other respects, the processing conditions were kept the same. In one run, also a so called pre-shrunk 7059 glass was used. Said substrate had been subjected to a heat treatment before processing in order to achieve a major part of shrinking already before processing. After completion of the run, the panels were inspected under microscope to determine whether there were any cracks in the thin film stack.

The following subjective criteria for cracking were used for assessing the extent of cracking:

Good: no cracks observed

Bad: so many cracks that the insulation layer is rendered unusable

Acceptable: some cracks were observed, but cracking was not so severe that the problem could not be avoided by means of precise process control ATO's were made by first growing a pure $Al_2O_3$ layer on the substrate and then growing alternating layers of $Al_2O_3$ and $TiO_2$ on the aluminium oxide layer. The ATO was always finished with pure $Al_2O_3$ layer. The notation 100A+25(100A/100T)+400A means that first 100 cycles of $Al_2O_3$ were processed after which 25 times alternating layers of 100 cycles of $Al_2O_3$ and 100 cycles of TiO2 were grown. This ATO was finished off with 400 cycles of pure $Al_2O_3$ Since the growth rate of $Al_2O_3$ and TiO2 at 500 ° C. using $AlCl_3$, $TiCl_4$ and $H_2O$ as precursors is close to 0.05 nm/cycles, the pulsing ratio yield also the thickness ratio of these films.

The following table summarises ATO's used for first grown and last grown and subjective cracking rating in 7059 glass.

TABLE 1

|  | first grown ATO 100 + 22(100/100) + 400 | first grown ATO 100 + 25(100/100) + 400 |
| --- | --- | --- |
| last grown ATO 500 + 18(100/100) + 500 | Ti/Al ratio = 0.714 Condition: Good | Ti/Al ratio = 0.741 Condition: Acceptable |
| last grown ATO 500 + 21(100/100) + 500 | Ti/Al ratio = 0.741 Condition: Acceptable | Ti/Al ratio = 0.754 Condition: Bad |

From the above data it is clearly apparent that reducing the relative amount of $TiO_2$ reduces cracking tendency. Also it is important to note that no films made with sodalime glass had any visible cracking. Also, 7059 panels that had been pre-shrunk with Ti/Al ratio 0.741 had Bad cracking instead of Acceptable. In other runs no pre-shrunk glass was used. This suggests, however, that shrinking has some role in cracking behaviour.

EXAMPLE 2

In another set of experiment ATO's and ZnS were grown in similar conditions as in Example 1. Instead of changing amount of alternating cycles of $TiO_2$ and $Al_2O_3$, individual $TiO_2$ layers thickness was varied. Also, total thickness of $Al_2O_3$ was kept constant. A more quantitative measure of cracking was utilised in this experiment. Instead of just observing cracking after run was complete, a subsequent heat treatment was done to all samples. Samples were exposed for 5 minutes to higher than 500 ° C. temperatures and the lowest temperature at which any cracking could be observed, was labeled the cracking temperature of that structure. This gives a measure of tolerance against cracking of a given film, so even if no cracks can be observed at normal conditions, using this method also those structures can be rated.

These experiment were made on a different type of commercial electronics substrate, namely NEG type OA-2.

The following table summarises cracking temperature observed and thickness ratio of $TiO_2$ and $Al_2O_3$:

TABLE 2

| $TiO_2/Al_2O_3$ thickness ratio | Cracking temperature, ° C. |
| --- | --- |
| 0.64 | 720 |
| 0.57 | 750 |
| 0.55 | 770 |
| 0.48 | 800 |
| 0.43 | 800 |
| 0.31 | 870 |

From these results it is readily noticeable that also in this case lowering of Ti/Al ratio will give structures that are more resistant to cracking.

What is claimed is:

1. An insulating film of a thin film structure deposited on an essentially alkali metal-free glass substrate, comprising a first buffer layer, a composite layer comprising alternating layers of aluminium oxide and titanium oxide, the ratio between the cumulative thicknesses of said titanium oxide and said aluminium oxide layers being less than 0.75, and a second buffer layer provided on top of the composite layer, said buffer layers having a significantly lower Ti-to Al-ratio than the composite layer.

2. The insulating film according to claim 1, wherein at least one of the buffer layer comprises aluminium oxide.

3. The insulating film according to claim 1, wherein the thickness of the first and second buffer layers, respectively, amount to 1 to 50% of the cumulative thickness of the aluminium oxide layers of the second composite layer.

4. The insulating film according to claim 1, wherein the cumulative thickness of the aluminium oxide layers is 50 to 400 nm and the cumulative thickness of the titanium oxide layers is 35 to 300 nm.

5. Thin Film Electroluminescent display device, comprising a substrate consisting of an essentially alkali metal-free substrate;

a first electrode layer provided on the substrate;

a second electrode layer spaced apart from the first electrode layer;

at least one phosphor layer fitted between the electrodes; and at least one dielectric layer provided on each side of each phosphor layer between the phosphor layer and the electrodes, at least one of said dielectric layers being constituted by alternating layers of aluminium oxide and titanium oxide, the ratio between the cumulative thicknesses of said titanium oxide and said aluminium oxide layers being less than 0.75.

6. The display device according to claim 5, wherein the dielectric layers on both sides of a phosphor layer comprise alternating layers of aluminium oxide and titanium oxide, the ratio between the cumulative thicknesses of said titanium oxide and said aluminium oxide layers being 0.2 to 0.6.

7. The display device according to claim 6, wherein the dielectric layer on the opposite side of a phosphor layer in respect to the glass substrate has a smaller ratio between the cumulative thicknesses of said titanium oxide and said aluminium oxide layers than the dielectric layer on the same side of the phosphor layer as the glass substrate.

8. The display device according to claim 5, wherein the substrate comprises borosilicate or aluminosilicate glass containing less than 1% free alkali metal ions.

9. The insulating film according to claim 3, wherein the thicknesses of the first and second buffer layers, respectively, amount to 10 to 40% of the cumulative thickness of the aluminium oxide layers of the second composite layer.

10. The display device according to claim 5, wherein one or more of the dielectric layers comprise a first buffer layer, a composite layer comprising alternating layers of aluminium oxide and titanium oxide and a second buffer layer provided on top of the composite layer, said buffer layers having a significantly lower Ti-to-Al ratio than the composite layer.

11. The display device according to claim 10, wherein at least one of the buffer layers comprises aluminium oxide.

12. The display device according to claim 10, wherein the thicknesses of the first and second buffer layers, respectively, amount to 1 to 50% of the cumulative thickness of the aluminium oxide layers of the second composite layer.

13. The display device according to claim 12, wherein the thicknesses of the first and second buffer layers, respectively, amount to 10 to 40% of the cumulative thickness of the aluminium oxide layers of the second layer.

14. The display device according to claim 5, wherein the cumulative thickness of the aluminium oxide layers is 50 to 400 nm and the cumulative thickness of the titanium oxide layers is 35 to 300 nm.

15. The insulating film according to claim 1, wherein the ratio between the cumulative thicknesses of said titanium oxide and said aluminium oxide layers is 0.2 to 0.6.

16. The insulating film according to claim 2, wherein the thicknesses of the first and second buffer layers, respectively, amount to 1 to 50% of the cumulative thickness of the aluminium oxide layers of the second composite layer.

17. The insulating film according to claim 16, wherein the thicknesses of the first and second buffer layers, respectively, amount to 10 to 40% of the cumulative thickness of the aluminium oxide layers of the second composite layer.

18. The insulating film according to claim 2, wherein the cumulative thickness of the aluminium oxide layers is 50 to 400 nm and the cumulative thickness of the titanium oxide layers is 35 to 300 nm.

19. The insulating film according to claim 3, wherein the cumulative thickness of the aluminium oxide layers is 50 to 400 nm and the cumulative thickness of the titanium oxide layers is 35 to 300 nm.

* * * * *